(12) United States Patent
Palumbo

(10) Patent No.: US 8,687,286 B2
(45) Date of Patent: Apr. 1, 2014

(54) MESO-OPTIC DEVICE

(75) Inventor: Perry A. Palumbo, Fort Collins, CO (US)

(73) Assignee: Hach Company, Loveland, CO (US)

( * ) Notice: Subject to any disclaimer, the term of this patent is extended or adjusted under 35 U.S.C. 154(b) by 0 days.

(21) Appl. No.: 13/395,153

(22) PCT Filed: Sep. 8, 2010

(86) PCT No.: PCT/US2010/048091
§ 371 (c)(1),
(2), (4) Date: Mar. 9, 2012

(87) PCT Pub. No.: WO2011/031730
PCT Pub. Date: Mar. 17, 2011

(65) Prior Publication Data
US 2012/0170137 A1 Jul. 5, 2012

Related U.S. Application Data

(60) Provisional application No. 61/241,654, filed on Sep. 11, 2009.

(51) Int. Cl.
G02B 13/18 (2006.01)
(52) U.S. Cl.
USPC ............................................ 359/709; 359/853
(58) Field of Classification Search
USPC ......... 359/641, 642, 709, 726–731, 853, 867, 359/708; 372/92–109
See application file for complete search history.

(56) References Cited

U.S. PATENT DOCUMENTS

| 4,040,749 A | 8/1977 | David et al. |
| 4,657,353 A | 4/1987 | Clegg |
| 4,697,867 A | 10/1987 | Blanc et al. |
| 5,382,999 A | 1/1995 | Kamon |

(Continued)

FOREIGN PATENT DOCUMENTS

| CN | 101403823 A1 | 4/2009 |
| EP | 343729 A1 | 11/1989 |
| EP | 483952 A2 | 5/1992 |

OTHER PUBLICATIONS

L M Soroko, Meso-Optics Foundations and Applications, 1996, World Scientific, pp. cover, bibliographic, 33, 146.*

(Continued)

Primary Examiner — Darryl J Collins
Assistant Examiner — Gary O'Neill
(74) Attorney, Agent, or Firm — Ference & Associates LLC

(57) ABSTRACT

A meso-optic device (1) includes a substantially annular meso-optic body (100) including an axis of revolution (2), a divergent conic optical surface (112) substantially coaxial with the axis of revolution (2), with the divergent conic optical surface (112) configured to receive electromagnetic radiation propagating along an optical axis (3) from an impingent direction, wherein the optical axis (3) is coincident with or intersects the axis of revolution (2), and with the divergent conic optical surface (112) configured to divergently re-direct the electromagnetic radiation away from the axis of revolution (2), and a convergent conic optical surface (114) substantially coaxial with the axis of revolution (2), with the convergent conic optical surface (114) configured to receive the electromagnetic radiation divergently re-directed by the divergent conic optical surface (112) and with the convergent conic optical surface (114) configured to convergently re-direct the electromagnetic radiation toward the axis of revolution (2).

18 Claims, 4 Drawing Sheets

(56) References Cited

U.S. PATENT DOCUMENTS

| | | |
|---|---|---|
| 5,949,929 A | 9/1999 | Hamm |
| 6,449,103 B1 | 9/2002 | Charles |
| 6,705,736 B1 | 3/2004 | Pressler |
| 7,277,740 B2 | 10/2007 | Rohleder et al. |
| 7,362,517 B2 | 4/2008 | Togino |
| 7,376,314 B2 | 5/2008 | Reininger |
| 7,929,219 B2 | 4/2011 | Togino |
| 2004/0263842 A1 | 12/2004 | Puppels |
| 2007/0183036 A1* | 8/2007 | Lipson et al. ............ 359/487 |
| 2007/0296971 A1 | 12/2007 | Larsen et al. |
| 2010/0118295 A1 | 5/2010 | Efimov |
| 2013/0135613 A1 | 5/2013 | Palumbo |

OTHER PUBLICATIONS

International Searching Authority, Search Report for International Application PCT/US2010/048091, Dec. 3, 2010, 4 pages (EPO).

Internatonal Searching Authority, Search Report for Internatonal Application PCT/US2011/046105, Mar. 7, 2012 (KR), 2 pages.

* cited by examiner

MESO-OPTIC DEVICE

BACKGROUND OF THE INVENTION

1. Field of the Invention

The invention is related to the field of optical devices, and in particular, to meso-optic optical devices.

2. Statement of the Problem

A useful characteristic of an optic or optical element is the ability of the optic to concentrate or focus electromagnetic radiation, or conversely, to direct the emission of radiation from an area along a predetermined ray path or axis, i.e. optical axis. It is equally useful to focus radiation into the form of a line coincident to an optical axis. An axicon possessing a refracting conical surface as shown in FIG. 1 provides a means to focus energy into a line-of-focus substantially coincident to the optical axis. An axicon with a refracting conical surface cannot, however, focus radiation substantially perpendicular to the optical axis.

A reflective forty-five degree annular axicon 1 of the prior art possessing a single reflective conical optical surface, as shown in FIG. 2, focuses radiation 5 substantially perpendicular to an focal axis separated from the axis of revolution by the incident angle β; i.e. the angular separation of the focal axis to the axis of revolution is related to the incident angle and forms a conical volume of focus with apex coincident with the apparent apex of the conical optical surface. Therefore, radiation does not fall perpendicular to the optical axis 3 or upon the axis of revolution 2. Only in special conditions where the axis of revolution and the optical axis are coincident does radiation fall perpendicular to the optical axis.

A reflective axicon of the prior art possessing more than one reflective conical optical surface as shown in FIG. 3, one form of a w-axicon, can act as a beam expander/reducer or shaper, modifying a propagating beam of radiation from a circular cross-section to a beam with annular cross-section or visa-versa, or can act much like a simple refractive axicon focusing radiation to a line along the optical axis. A reflection axicon of the prior art with two or more conic surfaces includes an ability to focus of radiation of along the optical axis. However, this prior art optic cannot focus radiation substantially perpendicular to the optical axis and is not able to direct radiation emitted radially divergently from the optical axis, rendering this optical configuration unsuitable in applications wherein substantial radial divergence from the line-of-focus is a requirement.

A w-axicon of the prior art with two forty-five degree conical optical surfaces as shown in FIG. 4, acting as a retro-reflector, returns the reflected beam towards the source of the radiation along the optical axis after reflecting from both conical optical surfaces, but does not form a line-of-focus. Used as a beam expander/reducer or beam shaper, the w-axicon of FIG. 4 returns the reflected beam towards the source of the radiation along the optical axis, but does so by illuminating first one conical optical surface and next the other conical optical surface, changing the shape of the incident beam from a circular cross-section to an annular cross-section or visa-versa.

FIG. 5 is a section view of a plano-convex lens of the prior art showing the conventions used to describe the relationship between the radius-of-curvature and saggita of a surface-of-revolution as applied to conic surfaces.

A desirable attribute of a meso-optic is the ability to collimate radiation that is radially divergent from a line-of-focus or cylindrical surface, and to redirect radiation to impinge substantially perpendicularly upon a cylindrical surface to a direction substantially parallel to axis of the cylindrical surface, i.e. a cylindrical focal surface. A cylindrical focal surface is useful for the stimulation of laser materials, especially those which are in the form of a cylinder or rod, solar concentrators, and for the detection and measurement of electromagnetic emissions at right angle to a stimulus beam of energy; as in the case wherein fluorescence or nephelometric measurements are to be made substantially at a right angle from the stimulating radiation. In order to detect low level electromagnetic events, such as photons impingent upon a photodiode as result of scatter from a small concentrations of particles in a suspension, or from the emission of energy that results in fluorescence, the electrical signal produced by means of photovoltaic effect must be greater than the noise signal produced as result of quantum phenomenon of the detector material. The detection limit is the discernable event signal with respect to the noise signal, often regarded as an event signal twice the standard deviation of the mean noise signal. Since the inherent noise signal of the detector cannot be eliminated completely, and the amount of the electromagnetic radiation available for detection is often limited, it is advantageous to collect and concentrate as much of the electromagnetic event onto the detection means as possible in order to maximize the signal-to-noise ratio. Often, radiation emission is radial to the axis of a cylindrical emitting surface or cylindrical volume. Conventional optics, as that of a cylindrical lens which focuses light to a line, rectangle, or semi-cylindrical field, are limited in the subtended angle about the long axis of the cylindrical surface to which it can operate without excessive optical aberrations. In other words, a cylindrical lens can image only that portion of a cylindrical surface that is facing the lens. Multiple cylindrical lenses are needed in order to achieve three hundred and sixty degree coverage of a cylindrical focal plane. In addition, if the emitted energy from a cylindrical surface is to be directed along the axis of the cylindrical surface, additional optical elements in the form of mirrors are needed. Directing the emitted energy from a cylindrical surface along a single optical axis is advantageous, and as result conventional optics such as mirrors, prisms, and lenses can be used. A reflective axicon of the prior art as shown in FIG. 2 is able to redirect radiation that is emitted radially divergently from a cylindrical surface to a direction substantially parallel to axis of the cylindrical surface only in special condition where the axis of the cylinder and axis of revolution are coincident. An axicon of the prior art utilizing a single conic surface is limited as to the ability to form a line-of-focus close to the optical axis when the incident rays are not parallel to the optical axis. Indeed, an axicon of the prior art that attempts to focus radiation that is substantially perpendicular to the optical axis will suffer from excessive off-axis aberrations; i.e., a line-of-focus that is formed non-coincident to the optical axis is substantially distorted and out of focus.

ASPECTS OF THE INVENTION

In one aspect of the invention, a meso-optic device comprises:
 a substantially annular meso-optic body including an axis of revolution;
 a divergent conic optical surface substantially coaxial with the axis of revolution, with the divergent conic optical surface configured to receive electromagnetic radiation propagating along an optical axis from an impingent direction, wherein the optical axis is coincident with or intersects the axis of revolution, and with the divergent conic optical surface configured to divergently re-direct the electromagnetic radiation away from the axis of revolution; and a convergent conic optical surface substantially coaxial with the axis of revolution, with the convergent conic optical surface configured to receive the electromagnetic radiation divergently re-directed by the divergent conic optical surface and with the convergent conic optical surface configured to convergently re-direct the electromagnetic radiation toward the axis of revolution.

Preferably, the substantially annular meso-optic body includes a substantially pentagonal cross-sectional shape.

Preferably, the divergent conic optical surface and the convergent conic optical surface are configured to substantially reflect, refract, or diffract the electromagnetic radiation.

Preferably, the electromagnetic radiation re-directed by the convergent conic optical surface converges substantially on the axis of revolution.

Preferably, the electromagnetic radiation re-directed by the convergent conic optical surface is substantially perpendicular to the electromagnetic radiation entering the meso-optic body, regardless of an angular separation or coincidence between the optical axis and the axis of revolution.

Preferably, the divergent conic optical surface is at a first angle ($\alpha 1$) from the axis of revolution and the convergent conic optical surface is at a second angle ($\alpha 2$) from the axis of revolution, wherein the first angle ($\alpha 1$) and the second angle ($\alpha 2$) are different.

Preferably, the divergent conic optical surface is at a first angle ($\alpha 1$) from the axis of revolution and the convergent conic optical surface is at a second angle ($\alpha 2$) from the axis of revolution and wherein the first angle ($\alpha 1$) is larger than the second angle ($\alpha 2$).

Preferably, the meso-optic body further comprises an annular planar optical surface located on an impingent direction side of the meso-optic body, with the annular planar optical surface configured to substantially pass the electromagnetic radiation, a cylindrical optical surface located around the axis of revolution and configured to substantially pass the electromagnetic radiation after the electromagnetic radiation leaves the convergent conic optical surface, and a non-optical conic surface extending between the divergent conic optical surface and the convergent conic optical surface, with the divergent conic optical surface, the convergent conic optical surface, the annular planar optical surface, the cylindrical optical surface, and the non-optical conic surface providing a substantially pentagonal cross-sectional shape of the meso-optic body, with said annular planar optical surface being oriented substantially radially to the axis of revolution and with an outside radius of the annular planar optical surface being in common with an inside radius of the convergent conic optical surface, with an inside radius of the annular planar optical surface being in common with one end of the cylindrical optical surface and with an other end of said cylindrical optical surface being in common with an inside radius of the divergent conic optical surface, and wherein the electromagnetic radiation leaving the convergent conic optical surface substantially passes through the cylindrical optical surface.

In one aspect of the invention, a meso-optic device comprises:

a substantially annular meso-optic body including an axis of revolution;

a divergent conic optical surface substantially coaxial with the axis of revolution, with the divergent conic optical surface configured to receive electromagnetic radiation propagating along an optical axis from an impingent direction, wherein the optical axis is coincident with or intersects the axis of revolution, and with the divergent conic optical surface configured to divergently re-direct the electromagnetic radiation away from the axis of revolution; and a convergent conic optical surface substantially coaxial with the axis of revolution, with the convergent conic optical surface configured to receive the electromagnetic radiation divergently re-directed by the divergent conic optical surface and with the convergent conic optical surface configured to convergently re-direct the electromagnetic radiation toward the axis of revolution;

wherein the divergent conic optical surface is at a first angle ($\alpha 1$) from the axis of revolution and wherein the convergent conic optical surface is at a second angle ($\alpha 2$) from the axis of revolution and wherein the first angle ($\alpha 1$) is larger than the second angle ($\alpha 2$).

Preferably, the substantially annular meso-optic body includes a substantially pentagonal cross-sectional shape.

Preferably, the divergent conic optical surface and the convergent conic optical surface are configured to substantially reflect, refract, or diffract the electromagnetic radiation.

Preferably, the electromagnetic radiation re-directed by the convergent conic optical surface converges substantially on the axis of revolution.

Preferably, the electromagnetic radiation re-directed by the convergent conic optical surface is substantially perpendicular to the electromagnetic radiation entering the meso-optic body, regardless of an angular separation or coincidence between the optical axis and the axis of revolution.

Preferably, the meso-optic body further comprises an annular planar optical surface located on an impingent direction side of the meso-optic body, with the annular planar optical surface configured to substantially pass the electromagnetic radiation, a cylindrical optical surface located around the axis of revolution and configured to substantially pass the electromagnetic radiation after the electromagnetic radiation leaves the convergent conic optical surface, and a non-optical conic surface extending between the divergent conic optical surface and the convergent conic optical surface, with the divergent conic optical surface, the convergent conic optical surface, the annular planar optical surface, the cylindrical optical surface, and the non-optical conic surface providing a substantially pentagonal cross-sectional shape of the meso-optic body, with said annular planar optical surface being oriented substantially radially to the axis of revolution and with an outside radius of the annular planar optical surface being in common with an inside radius of the convergent conic optical surface, with an inside radius of the annular planar optical surface being in common with one end of the cylindrical optical surface and with an other end of said cylindrical optical surface being in common with an inside radius of the divergent conic optical surface, and wherein the electromagnetic radiation leaving the convergent conic optical surface substantially passes through the cylindrical optical surface.

In one aspect of the invention, a meso-optic device comprises:

a substantially annular pentagonal meso-optic body including an axis of revolution;

a divergent conic optical surface substantially coaxial with the axis of revolution, with the divergent conic optical surface configured to receive electromagnetic radiation propagating along an optical axis from an impingent direction, wherein the optical axis is coincident with or intersects the axis of revolution, and with the divergent conic optical surface configured to divergently re-direct the electromagnetic radiation away from the axis of revolution;

a convergent conic optical surface substantially coaxial with the axis of revolution, with the convergent conic optical surface configured to receive the electromagnetic radiation divergently re-directed by the divergent conic optical surface and with the convergent conic optical surface configured to convergently re-direct the electromagnetic radiation toward the axis of revolution;

an annular planar optical surface located on an impingent direction side of the meso-optic body, with the annular planar optical surface configured to substantially pass the electromagnetic radiation;

a cylindrical optical surface located around the axis of revolution and configured to substantially pass the electromagnetic radiation after the electromagnetic radiation leaves the convergent conic optical surface; and a non-optical conic surface extending between the divergent conic optical surface and the convergent conic optical surface, with the divergent conic optical surface, the convergent conic optical surface, the annular planar optical surface, the cylindrical optical surface, and the non-optical conic surface providing a substantially pentagonal cross-sectional shape of the meso-optic body;

with said annular planar optical surface being oriented substantially radially to the axis of revolution and with an outside radius of the annular planar optical surface being in common with an inside radius of the convergent conic optical surface;

with an inside radius of the annular planar optical surface being in common with one end of the cylindrical optical surface and with an other end of said cylindrical optical surface being in common with an inside radius of the divergent conic optical surface; and wherein the electromagnetic radiation leaving the convergent conic optical surface substantially passes through the cylindrical optical surface.

Preferably, the divergent conic optical surface and the convergent conic optical surface are configured to substantially reflect, refract, or diffract the electromagnetic radiation.

Preferably, the electromagnetic radiation re-directed by the convergent conic optical surface converges substantially on the axis of revolution.

Preferably, the electromagnetic radiation re-directed by the convergent conic optical surface is substantially perpendicular to the electromagnetic radiation entering the meso-optic body, regardless of an angular separation or coincidence between the optical axis and the axis of revolution.

Preferably, the divergent conic optical surface is at a first angle ($\alpha 1$) from the axis of revolution and the convergent conic optical surface is at a second angle ($\alpha 2$) from the axis of revolution, wherein the first angle ($\alpha 1$) and the second angle ($\alpha 2$) are different.

Preferably, the divergent conic optical surface is at a first angle ($\alpha 1$) from the axis of revolution and the convergent conic optical surface is at a second angle ($\alpha 2$) from the axis of revolution and wherein the first angle ($\alpha 1$) is larger than the second angle ($\alpha 2$).

DESCRIPTION OF THE DRAWINGS

The same reference number represents the same element on all drawings.

DETAILED DESCRIPTION OF THE INVENTION

The figures and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 6A:
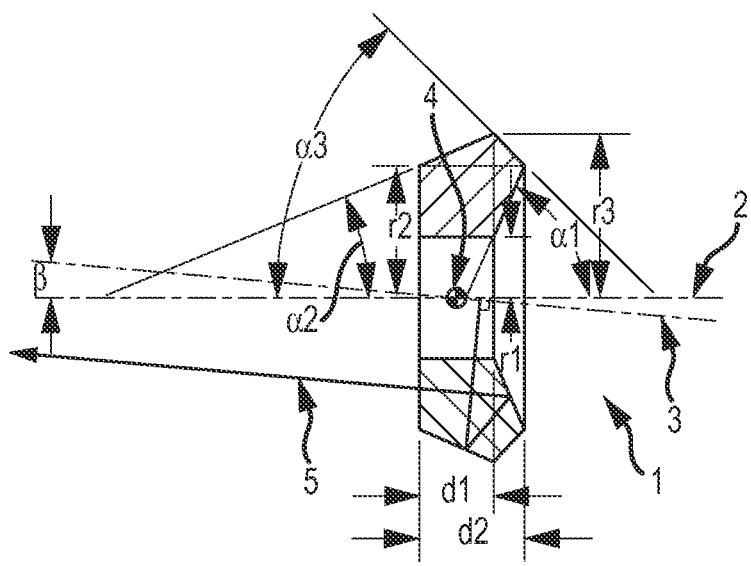
FIGS. 6a-6b show a meso-optic device according to the invention.
Figure 6B:
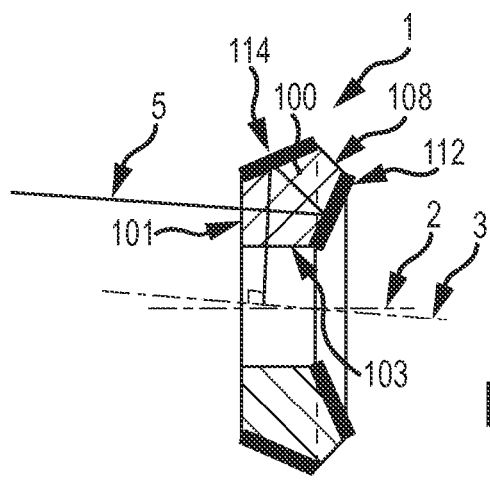

FIGS. 6a-6b show a meso-optic device 1 according to the invention. The meso-optic device 1 comprises a substantially annular meso-optic body 100 that is formed of an at least partially light-transmissive material. The meso-optic device 1 in the embodiment shown includes an annular planar optical surface 101, a cylindrical optical surface 103, and a non-optical conic surface 108. The annular planar optical surface 101, the cylindrical optical surface 103, and the non-optical conic surface 108 are all at least partially light-transmissive and will allow light to enter and/or exit the meso-optic device 1.

The meso-optic device 1 may be substantially annular. The meso-optic device 1 may be substantially annular including a substantially pentagonal cross-sectional shape.

Light generally enters the meso-optic device 1 through the annular planar optical surface 101. However, it should be understood that the light can conversely travel in the opposite direction and can exit via the annular planar optical surface 101. The left side of the meso-optic body 100 in the figures is therefore referred to as an impingement direction, with the annular planar optical surface 101 being located on an impingement direction side of the meso-optic body 100. Light entering or exiting the annular planar optical surface 101 therefore exist on the impingement direction side of the meso-optic body 100.

The light (such as light ray 5 graphically depicted in FIGS. 6a and 6b) can travel along an optical axis 3, as shown in the figures. The light (and the optical axis 3) can be parallel with the axis of revolution 2 of the meso-optic device 1. Alternatively, the light can be coincident with and can intersect the axis of revolution 2, as is shown by having the optical axis 3 differing from the axis of revolution 2 by an offset angle β.

The meso-optic device 1 may be used for visible light wavelengths. The meso-optic device 1 may be used for non-visible light wavelengths. The meso-optic device 1 is discussed herein in terms of light, but it should be understood that the meso-optic device 1 may be used for any manner of electromagnetic radiation.

The meso-optic device 1 further comprises a divergent conic optical surface 112 and a convergent conic optical surface 114. The divergent conic optical surface 112 and the convergent conic optical surface 114 can substantially reflect, refract, diffract, or otherwise block or re-direct light. Both the divergent conic optical surface 112 and the convergent conic optical surface 114 are configured to prevent light (or other radiation) from exiting and/or entering the meso-optic device 1.

The divergent conic optical surface 112 and the convergent conic optical surface 114 can comprise a part of the meso-optic body 100 or can comprise materials and/or structures affixed or added to the meso-optic body 100 or formed therein. For example, the divergent conic optical surface 112 and the convergent conic optical surface 114 can comprise films, deposited layers, etching, or similar materials or structures. The figure includes heavy black shading on the divergent conic optical surface 112 and the convergent conic optical surface 114 in order to show the difference from the other surfaces of the meso-optic device 1.

The divergent conic optical surface 112 and the convergent conic optical surface 114 in some embodiments are configured to internally re-direct light, as shown in FIG. 6b. Consequently, the meso-optic device 1 is constructed to receive and interact with and re-direct impinging light in a predetermined manner.

Figure 7:
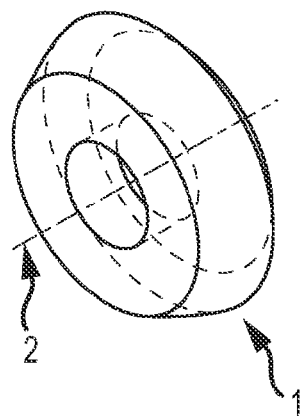
FIG. 7 is an isometric view of the meso-optic device of FIGS. 8a-8b.

FIG. 7 is an isometric view of the meso-optic device 1 of FIGS. 6a-6b. This figure corresponds to the cross-sectional views of FIGS. 6a-6b and shows a volume type (i.e., solid volume) annular meso-optic device 1. The meso-optic device 1 of the volume type is configured to receive impinging radiation, wherein the impinging radiation enters the meso-optic body 100 and is substantially internally re-directed.

An advantage of the solid volume meso-optic device 1 is that internally reflecting surfaces are resistant to hostile environments, wherein exposure of the reflective surfaces could otherwise damage the reflective materials or coatings by means of corrosion or abrasion. In addition, the solid volume construction of the meso-optic device 1 of FIGS. 6-7 is easily fabricated; as the optical surfaces are externally accessible, making inspection and optical coatings simpler to apply.

The meso-optic body 100 can be formed of any suitable material or materials. Generally, the meso-optic body 100 will substantially pass light (or other electromagnetic radiation). However, the divergent conic optical surface 112 and the convergent conic optical surface 114 are configured to substantially re-direct light impinging on these two surfaces or surface components. Electromagnetic radiation propagates through the meso-optic body 100 or is re-directed substantially at a boundary of the meso-optic body 100 at wavelength(s) of interest. The electromagnetic radiation may be re-directed in whole or in part. The re-direction may include some or all of the intensity and/or spectral content of the radiation. The re-direction may be a result of the characteristic reflectance and/or absorbance of the optical surfaces and/or materials of construction of the meso-optic body 100. The re-direction may be achieved by reflectance, refraction, diffraction, or any combination thereof.

In some embodiments, light travels parallel to the optical axis 3, as shown by the light ray 5. The optical axis 3 may be parallel to, or divergent from, the axis of rotation 2 of the meso-optic device 1. The ray 5 enters the meso-optic body 100 through the annular planar surface 101 and travels through the meso-optic body 100 until it reaches the divergent conic optical surface 112. The divergent conic optical surface 112 receives the ray 5 and substantially re-directs the ray 5 toward the convergent conic optical surface 114, as shown in the figure. Similarly, the convergent conic optical surface 114 receives the ray 5 and substantially re-directs the ray 5 toward the cylindrical optical surface 103. The ray 5 subsequently exits the meso-optic body 100 and is concentrated at a point along a line-of-focus. The line-of-focus may be parallel to and/or identical with the optical axis 3. Along the line-of-focus, the ray 5 may be substantially perpendicular to the optical axis 3, as is shown in the figure.

The annular planar optical surface 101 in some embodiments may substantially allow the ray 5 to enter the meso-optic body 100. Alternatively, in other embodiments may somewhat refract, diffract, or affect the radiation passing therethrough. The annular planar optical surface 101 in some embodiments may substantially allow the ray 5 to exit the meso-optic body 100, depending on the direction of travel of the radiation.

The cylindrical optical surface 103 in some embodiments may substantially allow the ray 5 to exit the meso-optic body 100. Alternatively, in other embodiments the cylindrical optical surface 103 may somewhat refract, diffract, or affect the light passing therethrough. The cylindrical optical surface 103 in some embodiments may substantially allow the ray 5 to enter the meso-optic body 100, depending on the direction of travel of the radiation.

The divergent conic optical surface 112 and the convergent conic optical surface 114 in some embodiments are substantially coaxial. The divergent conic optical surface 112 and the convergent conic optical surface 114 in some embodiments are substantially concentric. The divergent conic optical surface 112 and the convergent conic optical surface 114 in some embodiments are substantially conical in shape. The divergent conic optical surface 112 and the convergent conic optical surface 114 in some embodiments are substantially curved conical in shape.

The divergent conic optical surface 112 and the convergent conic optical surface 114 may be formed at the same or different angles from the axis of rotation 2. In some embodiments, the divergent conic optical surface 112 is formed at a first angle ($\alpha 1$) from the axis of rotation 2 and the convergent conic optical surface 114 is formed at a second angle ($\alpha 2$) from the axis of rotation 2. In some embodiments, the divergent conic optical surface 112 is formed at a first angle ($\alpha 1$) from the axis of rotation 2 and the convergent conic optical surface 114 is formed at a second angle ($\alpha 2$) from the axis of rotation 2, wherein the first angle ($\alpha 1$) is different from the second angle ($\alpha 2$). In some embodiments, the divergent conic optical surface 112 is formed at a first angle ($\alpha 1$) from the axis of rotation 2 and the convergent conic optical surface 114 is formed at a second angle ($\alpha 2$) from the axis of rotation 2, wherein the first angle ($\alpha 1$) is larger than the second angle ($\alpha 2$).

The meso-optic device 1 may comprise a device including at least two re-directing optical surfaces. The meso-optic device 1 may comprise a device including at least two internally re-directing optical surfaces. Alternatively, the meso-optic device 1 may comprise a device including at least two externally re-directing optical surfaces. The meso-optic device 1 comprises a device including at least two re-directing optical surfaces at different angles to a common axis of rotation.

The meso-optic device 1 comprises a device including optical surfaces configured to receive impinging light and re-direct it to substantially a point, or vice-versa. The meso-optic device 1 comprises a device including optical surfaces configured to receive impinging light and re-direct it to substantially a line, even where the optical axis 3 diverges from and is not parallel to the axis of rotation 2. The meso-optic device 1 comprises a device including optical surfaces configured to receive impinging light and re-direct it to substantially a cylinder or a cylindrical or annular line, even where the optical axis 3 diverges from and is not parallel to the axis of rotation 2.

The meso-optic device 1 comprises a device including a second convergent optical surface 114 fixed in angular relationship to a first divergent optical surface 112 in order to counter the displacement of the line-of-focus from the optical axis in response to divergence of optical axis 3 from axis-of-rotation 2 that would occur without such relationship. It should be understood that substantially all of the light entering the annular planar optical surface 101 may be re-directed by the divergent conic optical surface 112 toward the convergent conic optical surface 114. It should be understood that substantially all of the light entering the annular planar surface 101 may be re-directed by the divergent conic optical surface 112 toward the convergent conic optical surface 114, even where the optical axis 3 diverges from the axis of rotation 2.

The meso-optic device 1 in some embodiments is disclosed comprises at least two concentric conic re-directing optical surfaces that are radially disposed about an axis of revolution 2. In some embodiments, the re-directing surfaces meet to form a circle-of-intersection at a radial distance from the axis of revolution 2. An optical axis 3, along which electromagnetic radiation propagates, and upon which said radiation is impingent, substantially perpendicular or radially divergent from regardless of the angular separation or coincidence of the axis of revolution 2 to the optical axis 3. The incidence angle of radiation propagating along the optical axis 3 is related to a displacement of the line-of-focus about the optical axis 3, substantially parallel to the optical axis 3. The meso-optic device 1 substantially compensates for angular separation of the axis of revolution 2 and the optical axis 3. An advantage is that the line-of-focus remains substantially parallel to the optical axis 3 regardless of the angle of incidence to the meso-optic device 1, and conversely; an emission radially divergent from the line-of-focus about the optical axis 3 propagates along the optical axis 3 at an angle in relation to the displacement of the line-of-focus substantially parallel to the optical axis 3.

Figure 5:
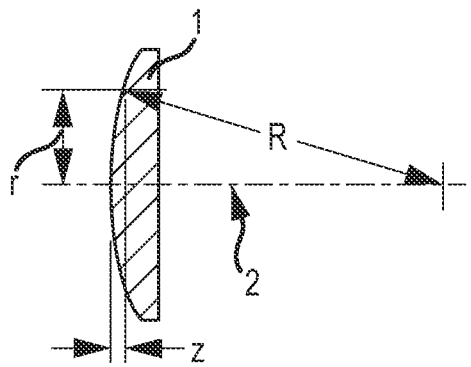
FIG. 5 is a section view of a plano-convex lens of the prior art showing the conventions used to describe the relationship between the radius-of-curvature and saggita of a surface-of-revolution as applied to conic surfaces.

As shown in FIG. 5 of the section view of the prior art plano-convex lens 1, surface saggita z or distance along the axis of revolution 2 from the apex of a surface-of-revolution, can be described in terms of the perpendicular radial distance r from the axis of revolution, conic constant k ($k := -\epsilon^2$, where $\epsilon$ is equal to the eccentricity of the conic section; (−) negative for a conical surface), and the curvature of the surface c (where curvature c is equal to the reciprocal of the radius of curvature R or $c = 1/R$), as;

$$z := \frac{c \cdot r^2}{1 + \sqrt{1 - (1+k) \cdot c^2 \cdot r^2}} \quad (1)$$

Figure 1:
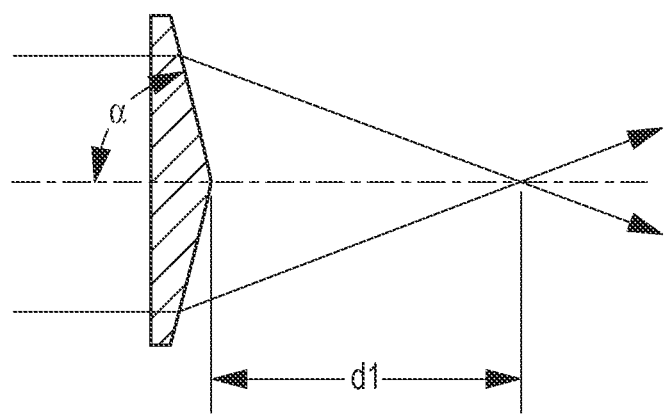
FIG. 1 is a profile view of a refractive axicon of the prior art comprised of a single conical optical surface.

In the case where $|(1+k) \cdot c^2 \cdot r^2| \gg 1$, the case of an axicon as shown in FIG. 1 of the prior art, the saggita equation may be simplified to;

$$z := \frac{r}{\sqrt{-(1+k)}} \quad (2)$$

or:

$$z := r \cdot \tan(\alpha) \quad (3)$$

Where $\alpha$ is the tangential angle of the conic surface to the axis of revolution; a constant. The curvature c is used to approximate the curvature at the apex of the conic surface. The curvature c of the conic surfaces is selected so as to have a negligible deviation of a conic optical surface of constant angle; i.e., an optical surface in the shape of a cone. In the embodiment of the annular pentagonal meso-optic device 1 shown in FIG. 6 and FIG. 7, preferentially an angle $\alpha_1$ of $$\frac{3 \cdot \pi}{8}$$

radians is selected for the divergent conic optical surface 112 and an angle $\alpha_2$ of $$\frac{\pi}{8}$$

radians is selected for the convergent conic optical surface 114. Although angles $\alpha_1$ and $\alpha_2$ are preferentially selected, any angles wherein the difference is $\alpha_1 - \alpha_2$ is equal to $$\frac{\pi}{4}$$

can be practiced as alternate embodiments of the invention. The inside radius of the divergent conic optical surface r1, is preferentially selected; r1 being the radial distance perpendicular to the axis of revolution 2. The inside radius of the convergent conic optical surface r2, is determined from the chord length of the line-of-focus d1. The inside radius of the convergent conic optical surface 114 and the divergent conic optical surface 112 are separated by the chord length of the line-of-focus d1 along the axis of revolution 2. The inside radius of the convergent conic optical surface r2 has a radius equal to the inside radius of the divergent conic optical surface r1 plus the chord length of the line-of-focus d1 perpendicular to the axis of revolution 2. The outside radius r3 of the meso-optic device 1 has a maximum radius equal to the intersection of the first conic surface and the second conic surface. The outside radius r3 has a minimum radius which does not vignette rays to the line-of-focus from a point source radiating from an infinite distance along optical axis 3, i.e., rays parallel to the optical axis. The minimum outside radius r3 is not less than $r1 + d1 + d1 \cdot \tan(\alpha_2)$ or $$r1 + d1 + \frac{d1}{\tan(\alpha_1)}.$$

Likewise, the overall length d2 of the meso-optic device 1 is not less than d1+d1·tan($\alpha^2$) or $$d1 + \frac{d1}{\tan(\alpha_1)}$$

else the vignette of the line-of-focus may occur.

The angular separation β of axis-of-rotation 2 and optical axis 3, or field angle of the incident radiation, is limited by the complete vignette of the incident electromagnetic radiation. The maximum value of β is less than the arctangent of clear aperture of the optic divided by the total track through the optic.

In some embodiments it is desirable to minimize both the length and outside diameter of the meso-optic device 1 in order to minimize the costs of material and fabrication. To minimize the volume or outside diameter of the meso-optic device 1 to the minimum non-vignette practice of the invention no matter the construction, a third non-optical conic surface 108 of angle $\alpha_3$ of $$\frac{3 \cdot \pi}{4}$$

radians may be employed. A volume-type meso-optic device 1 requires at least two additional optical surfaces; an annular planar optical surface 101 that is substantially perpendicular to the axis of revolution 2, and a cylindrical optical surface 103 that is substantially parallel to the axis of revolution 2. Both the annular planar optical surface 101 and the cylindrical optical surface 103 may be transparent to the electromagnetic radiation of interest. For work in the visible region of the electromagnetic spectrum, an optical material such as Schott Glass Technologies BK7 is one of many materials suitable as substrate in the construction of the meso-optic device 1.

One end of the cylindrical optical surface 103 is common with the inside radius of the annular planar optical surface 101. The other end of the cylindrical optical surface 103 is common with the inside radius r1 of the divergent conic optical surface 112. In addition, the outside radius of the annular planar optical surface 101 is common with the inside radius r2 of the convergent conic optical surface 114.

The annular planar optical surface 101 transmits electromagnetic radiation substantially along the optical axis 3. The cylindrical optical surface 103 of the meso-optic device 1 transmits radiation that is radially divergent, i.e., that is substantially perpendicular to the optical axis.

Figure 2:
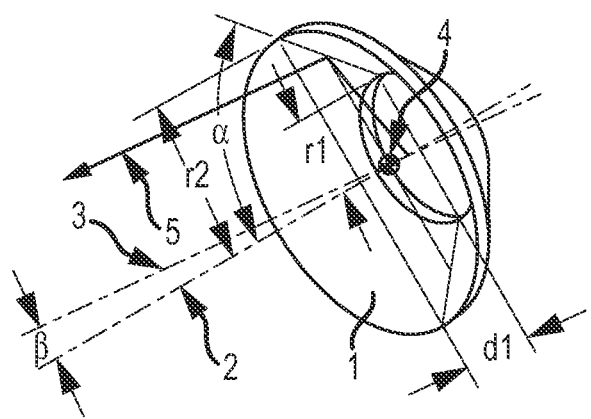
FIG. 2 is an isometric view of a forty-five degree annular axicon of the prior art comprised of a single reflective conical optical surface showing ray coincidence not perpendicular to the optical axis for the condition where the axis of revolution is not coincident with the optical axis.
Figure 3:
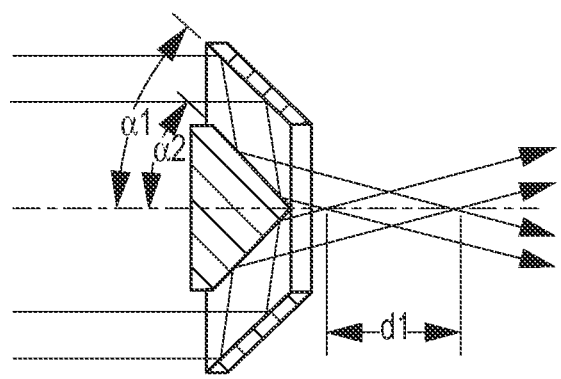
FIG. 3 is a section view of a reflective axicon of the prior art comprised of two conical optical surfaces showing ray coincidence that is not perpendicular to the optical axis.
Figure 4:
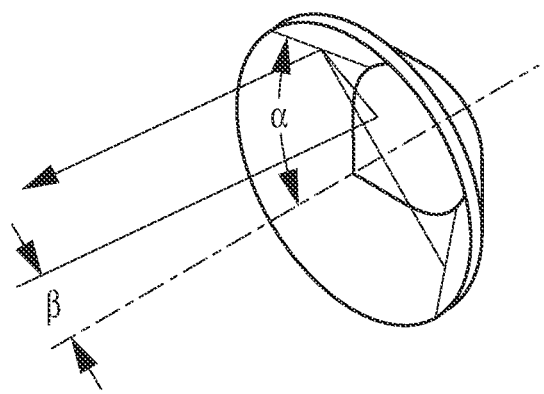
FIG. 4 is an isometric view of a w-axicon of the prior art comprised of two forty-five degree conical optical surfaces configured to return a beam propagating along the optical axis regardless of the angle of incidence.

When a third non-optical conical surface 108 is employed to reduce the volume annular pentagonal meso-optic to the minimum non-vignette practice of the invention, the meso-optic device 1 in some embodiments has the form of an annular pentagonal volume of revolution; i.e., an annulus with a substantially pentagonal or pentaprism cross-sectional shape, wherein the shape can include equal angles and side dimensions or unequal angles and side dimensions. Unlike a forty-five degree annular axicon of the prior art such as shown in FIG. 2, where the focus falls about the axis of revolution at twice the incident angle, for an annular pentagonal meso-optic device 1 according to some embodiments of the invention, the focus is substantially perpendicular to the optical axis 3 regardless of the angle of incidence or inclination to the axis of revolution 2. Electromagnetic radiation in form of a ray 5, propagating parallel to the optical axis 3, is reflected by the first and second conic optical surfaces r1 and r2 and falls incident upon optical axis 3 at an angle substantially perpendicular to the optical axis 3. A point located at (½ d1) along the axis of revolution 2, datum 4, is coincident to optical axis 3; the point about which the angular separation between the axis of revolution 2 and optical axis 3 is formed.

A focal displacement is also disclosed wherein radiation reflected by the meso-optic device 1 forms a line-of-focus d1 about the optical axis 3 that is related to the field angle of the radiation propagating along the optical axis 3. An annular pentagonal meso-optic of the preferred embodiment, possessing dimension equal to about r1=6.5 mm, about r2=14.5 mm, and about d1=8 mm provides the result given in TABLE 1, below. TABLE 1 shows the axial performance of an annular pentagonal meso-optic that is evaluated with respect to the optical axis at 660 nm and where r1=6.5 mm, r2=14.5 mm, d1=8 mm, and substrate=BK7.

TABLE 1

| | Annular Pentagonal Meso-optic | |
|---|---|---|
| Incident Angle (deg) | Line-of-focus RMS Width (mm) | Displacement from Optical Axis (mm) |
| 0.0 | 0.0 | 0.0 |
| 0.5 | 0.000031 | 0.093 |
| 1.0 | 0.000127 | 0.191 |
| 1.5 | 0.000288 | 0.292 |
| 2.0 | 0.000515 | 0.396 |
| 2.5 | 0.000811 | 0.504 |
| 3.0 | 0.001177 | 0.616 |
| 3.5 | 0.001616 | 0.732 |
| 4.0 | 0.002127 | 0.852 |
| 4.5 | 0.002715 | 0.975 |
| 5.0 | 0.003380 | 1.102 |
| 5.5 | 0.004125 | 1.232 |
| 6.0 | 0.004952 | 1.367 |
| 6.5 | 0.005862 | 1.505 |

Provided a slight deviation in perpendicularity for rays impinging about the optical axis, (less than 1 degree for the incident angles given in TABLE 1), the line-of-focus width may be improved to near a diffraction limit; at an incident angle of 6.5 degrees the RMS line width is improved to 0.0001801 mm at 660 nm (in comparison, a forty-five degree reflective axicon of the prior art at an incident angle of 6.5 degrees has a line-of-focus inclined at 14.790 degrees in respect to the optical axis).

Another aspect of the invention is disclosed wherein an electromagnetic radiation ray 5 of FIG. 6 propagating along the optical axis 3, incident upon the clear aperture of the meso-optic device 1, forms a line-of-focus; if unimpeded, (by objection, vignette, scatter, or absorption), subsequently propagates a second path through the optic to return along optical axis 3 at the angle of incidence. Applying a reflective film to the cylindrical optical surface 103 of a solid volume meso-optic device 1 would likewise return a beam along the optical axis 3—except without reversal of the ray orientation or line-of-focus d1 formation. Advantageously, a detector surface projected into the clear aperture by means of a collimating lens may be able to self-image; i.e., makes detection of radiation possible only as a result of stimulated specular and/or diffuse scattering of radiation, or the stimulated emission of radiation of an object(s), particles(s), substance(s), or material(s) within the volume of the cylindrical surface, preferentially stimulated along the line-of-focus.

Figure 8A:
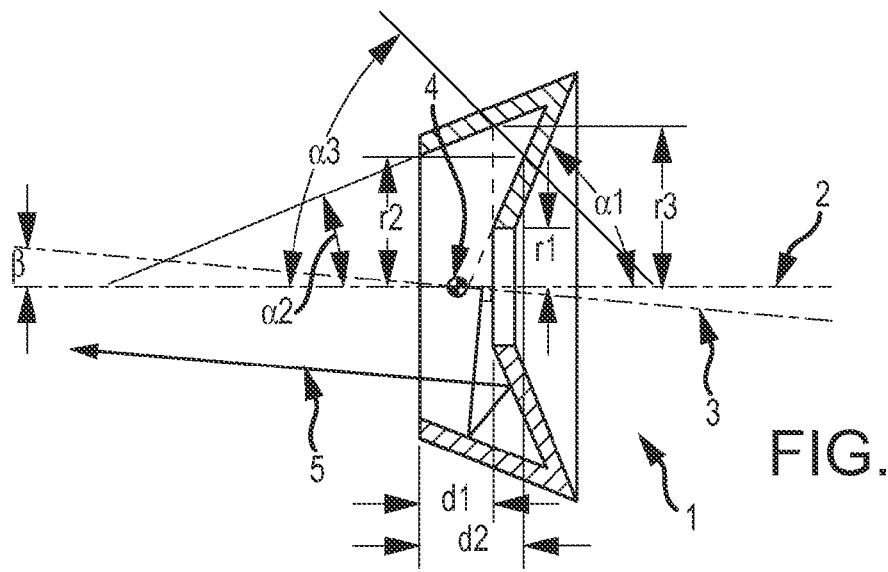
FIGS. 8a-8b show a first-surface-reflecting meso-optic device wherein the divergent conic optical surface and the convergent conic optical surface comprise first-surface-reflecting surfaces that re-direct the impinging radiation without the radiation entering the meso-optic body.
Figure 8B:
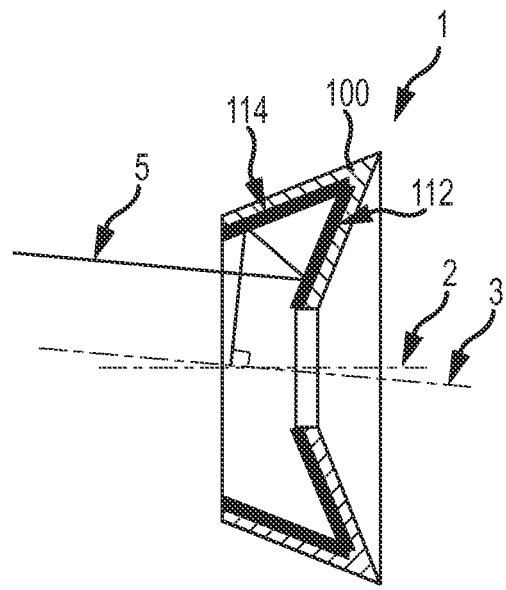

FIGS. 8a-8b show a first-surface-reflecting meso-optic device 1, wherein the divergent conic optical surface 112 and the convergent conic optical surface 114 comprise first-surface-reflecting surfaces that re-direct the impinging radiation without the radiation entering the meso-optic body 100. The meso-optic device 1 comprised of first-surface-reflecting conical optical surfaces has an inferred pentagonal cross-section of revolution. The entrance aperture, r2 minus r1, forms one side of the inferred pentagonal shape. The distance along the axis of revolution 2 between the entrance aperture at radial distance r1 and the first conical optical surface form the second side of the inferred pentagonal cross-section of revolution. The third and fourth sides of the pentagonal cross-section are that of the conical optical surfaces. The last side of the pentagonal cross-section is inferred by the reduction in the length and outside diameter of the meso-optic device 1 to a minimum.

An advantage of the meso-optic device 1 possessing first-surface-reflecting conical optical surfaces 112 and 114 is the lack of refraction or surface reflection, which may introduce errors in focus or loss of radiation, especially wherein the angle of incidence is not perpendicular to the transparent optical surfaces. Another advantage is due to the lack of absorption or scatter of propagating electromagnetic radiation within a substrate media.

Figure 9:
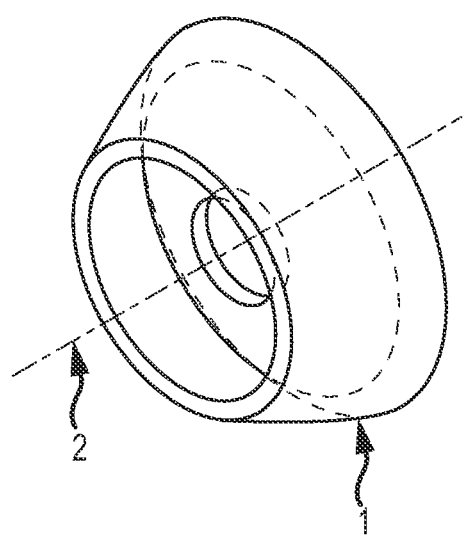
FIG. 9 is an isometric view of the meso-optic device of FIGS. 8a-8b.

FIG. 9 is an isometric view of the meso-optic device 1 of FIGS. 8a-8b. This figure corresponds to the cross-sectional views of FIGS. 8a-8b and shows a non-internal annular meso-optic device 1. The non-internal meso-optic device 1 is configured to re-direct impinging radiation without the impinging radiation entering the meso-optic body 100. Consequently, the impinging radiation is substantially externally re-directed.

It can be realized by one skilled in the art of optics that one or more of the optical surfaces of the meso-optic device 1 of any of the embodiments may be modified to refract or diffract electromagnetic radiation to correct aberration or to reduce or lengthen the line-of-focus. Modifying one or more optical surfaces of the meso-optic device 1 can result in a reduction in the line-of-focus. The reduction in the line-of-focus, when taken to an extreme, may result in a point, circle, or annulus of focus. It is also apparent that electromagnetic radiation propagating through, or reflected by the optical surfaces of the meso-optic device 1, may in whole or part be modified with regard to the intensity and/or spectral content as result of the reflectance and/or absorbance characteristics of the optical surfaces and/or materials of construction.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention. Accordingly, the scope of the invention should be determined from the following claims.

I claim:

1. A meso-optic device, comprising:
   a substantially annular meso-optic body including an axis of revolution;
   a divergent conic optical surface substantially coaxial with the axis of revolution, with the divergent conic optical surface configured to receive electromagnetic radiation propagating along an optical axis from an impingent direction, wherein the optical axis is coincident with or intersects the axis of revolution, and with the divergent conic optical surface configured to divergently re-direct the electromagnetic radiation away from the axis of revolution; and
   a convergent conic optical surface substantially coaxial with the axis of revolution with the convergent conic optical surface configured to receive the electromagnetic radiation divergently re-directed by the divergent conic optical surface and with the convergent conic optical surface configured to convergently re-direct the electromagnetic radiation toward the axis of revolution;
   with the meso-optic body further comprising:
   an annular planar optical surface located on an impingent direction side of the meso-optic body, with the annular planar optical surface configured to substantially pass the electromagnetic radiation;
   a cylindrical optical surface located around the axis of revolution and configured to substantially pass the electromagnetic radiation after the electromagnetic radiation leaves the convergent conic optical surface; and
   a non-optical conic surface extending between the divergent conic optical surface and the convergent conic optical surface, with the divergent conic optical surface, the convergent conic optical surface, the annular planar optical surface, the cylindrical optical surface, and the non-optical conic surface providing a substantially pentagonal cross-sectional shape of the meso-optic body;
   with said annular planar optical surface being oriented substantially radially to the axis of revolution and with an outside radius of the annular planar optical surface being in common with an inside radius of the convergent conic optical surface; with an inside radius of the annular planar optical surface being in common with one end of the cylindrical optical surface and with an other end of said cylindrical optical surface being in common with an inside radius of the divergent conic optical surface; and
   wherein the electromagnetic radiation leaving the convergent conic optical surface substantially passes through the cylindrical optical surface.

2. The meso-optic device of claim 1, with the substantially annular meso-optic body including a substantially pentagonal cross-sectional shape.

3. The meso-optic device of claim 1, wherein the divergent conic optical surface and the convergent conic optical surface are configured to substantially reflect, refract, or diffract the electromagnetic radiation.

4. The meso-optic device of claim 1, wherein the electromagnetic radiation re-directed by the convergent conic optical surface converges substantially on the axis of revolution.

5. The meso-optic device of claim 1, wherein the electromagnetic radiation re-directed by the convergent conic optical surface is substantially perpendicular to the electromagnetic radiation entering the meso-optic body, regardless of an angular separation or coincidence between the optical axis and the axis of revolution.

6. The meso-optic device of claim 1, wherein the divergent conic optical surface is at a first angle ($\alpha 1$) from the axis of revolution and wherein the convergent conic optical surface is at a second angle ($\alpha 2$) from the axis of revolution, wherein the first angle ($\alpha 1$) and the second angle ($\alpha 2$) are different.

7. The meso-optic device of claim 1, wherein the divergent conic optical surface is at a first angle ($\alpha 1$) from the axis of revolution and wherein the convergent conic optical surface is at a second angle ($\alpha$ 2) from the axis of revolution and wherein the first angle ($\alpha$ 1) is larger than the second angle ($\alpha$ 2).

8. A meso-optic device, comprising:
a substantially annular meso-optic body including an axis of revolution;
a divergent conic optical surface substantially coaxial with the axis of revolution, with the divergent conic optical surface configured to receive electromagnetic radiation propagating along an optical axis from an impingent direction, wherein the optical axis is coincident with or intersects the axis of revolution, and with the divergent conic optical surface configured to divergently re-direct the electromagnetic radiation away from the axis of revolution; and
a convergent conic optical surface substantially coaxial with the axis of revolution, with the convergent conic optical surface configured to receive the electromagnetic radiation divergently re-directed by the divergent conic optical surface and with the convergent conic optical surface configured to convergently re-direct the electromagnetic radiation toward the axis of revolution;
wherein the divergent conic optical surface is at a first angle ($\alpha$ 1) from the axis of revolution and wherein the convergent conic optical surface is at a second angle ($\alpha$ 2) from the axis of revolution and wherein the first angle ($\alpha$ 1) is larger than the second angle ($\alpha$ 2);
with the meso-optic body further comprising:
an annular planar optical surface located on an impingent direction side of the meso-optic body, with the annular planar optical surface configured to substantially pass the electromagnetic radiation; a cylindrical optical surface located around the axis of revolution and configured to substantially pass the electromagnetic radiation after the electromagnetic radiation leaves the convergent conic optical surface; and
a non-optical conic surface extending between the divergent conic optical surface and the convergent conic optical surface, with the divergent conic optical surface, the convergent conic optical surface, the annular planar optical surface, the cylindrical optical surface, and the non-optical conic surface providing a substantially pentagonal cross-sectional shape of the meso-optic body;
with said annular planar optical surface being oriented substantially radially to the axis of revolution and with an outside radius of the annular planar optical surface being in common with an inside radius of the convergent conic optical surface;
with an inside radius of the annular planar optical surface being in common with one end of the cylindrical optical surface and with an other end of said cylindrical optical surface being in common with an inside radius of the divergent conic optical surface; and
wherein the electroma netic radiation leavin the conver ent conic optical surface substantially passes through the cylindrical optical surface.

9. The meso-optic device of claim 8, with the substantially annular meso-optic body including a substantially pentagonal cross-sectional shape.

10. The meso-optic device of claim 8, wherein the divergent conic optical surface and the convergent conic optical surface are configured to substantially reflect, refract, or diffract the electromagnetic radiation.

11. The meso-optic device of claim 8, wherein the electromagnetic radiation re-directed by the convergent conic optical surface converges substantially on the axis of revolution.

12. The meso-optic device of claim 8, wherein the electromagnetic radiation re-directed by the convergent conic optical surface is substantially perpendicular to the electromagnetic radiation entering the meso-optic body, regardless of an angular separation or coincidence between the optical axis and the axis of revolution.

13. A meso-optic device, comprising:
a substantially annular pentagonal meso-optic body including an axis of revolution;
a divergent conic optical surface substantially coaxial with the axis of revolution, with the divergent conic optical surface configured to receive electromagnetic radiation propagating along an optical axis from an impingent direction, wherein the optical axis is coincident with or intersects the axis of revolution, and with the divergent conic optical surface configured to divergently re-direct the electromagnetic radiation away from the axis of revolution;
a convergent conic optical surface substantially coaxial with the axis of revolution, with the convergent conic optical surface configured to receive the electromagnetic radiation divergently re-directed by the divergent conic optical surface and with the convergent conic optical surface configured to convergently re-direct the electromagnetic radiation toward the axis of revolution;
an annular planar optical surface located on an impingent direction side of the meso-optic body, with the annular planar optical surface configured to substantially pass the electromagnetic radiation; a cylindrical optical surface located around the axis of revolution and configured to substantially pass the electromagnetic radiation after the electromagnetic radiation leaves the convergent conic optical surface; and
a non-optical conic surface extending between the divergent conic optical surface and the convergent conic optical surface, with the divergent conic optical surface, the convergent conic optical surface, the annular planar optical surface, the cylindrical optical surface, and the non-optical conic surface providing a substantially pentagonal cross-sectional shape of the meso-optic body;
with said annular planar optical surface being oriented substantially radially to the axis of revolution and with an outside radius of the annular planar optical surface being in common with an inside radius of the convergent conic optical surface;
with an inside radius of the annular planar optical surface being in common with one end of the cylindrical optical surface and with an other end of said cylindrical optical surface being in common with an inside radius of the divergent conic optical surface; and
wherein the electromagnetic radiation leaving the convergent conic optical surface substantially passes through the cylindrical optical surface.

14. The meso-optic device of claim 13, wherein the divergent conic optical surface and the convergent conic optical surface are configured to substantially reflect, refract, or diffract the electromagnetic radiation.

15. The meso-optic device of claim 13, wherein the electromagnetic radiation re-directed by the convergent conic optical surface converges substantially on the axis of revolution.

16. The meso-optic device of claim 13, wherein the electromagnetic radiation re-directed by the convergent conic optical surface is substantially perpendicular to the electromagnetic radiation entering the meso-optic body, regardless of an angular separation or coincidence between the optical axis and the axis of revolution.

17. The meso-optic device of claim 13, wherein the divergent conic optical surface is at a first angle ($\alpha 1$) from the axis of revolution and wherein the convergent conic optical surface is at a second angle ($\alpha 2$) from the axis of revolution, wherein the first angle ($\alpha 1$) and the second angle ($\alpha 2$) are different.

18. The meso-optic device of claim 13, wherein the divergent conic optical surface is at a first angle ($\alpha 1$) from the axis of revolution and wherein the convergent conic optical surface is at a second angle ($\alpha 2$) from the axis of revolution and wherein the first angle ($\alpha 1$) is larger than the second angle ($\alpha 2$).

* * * * *